P. A. ANDERSON.
SHOCK ABSORBER.
APPLICATION FILED OCT. 1, 1913.
1,213,139.
Patented Jan. 23, 1917.
2 SHEETS—SHEET 1.
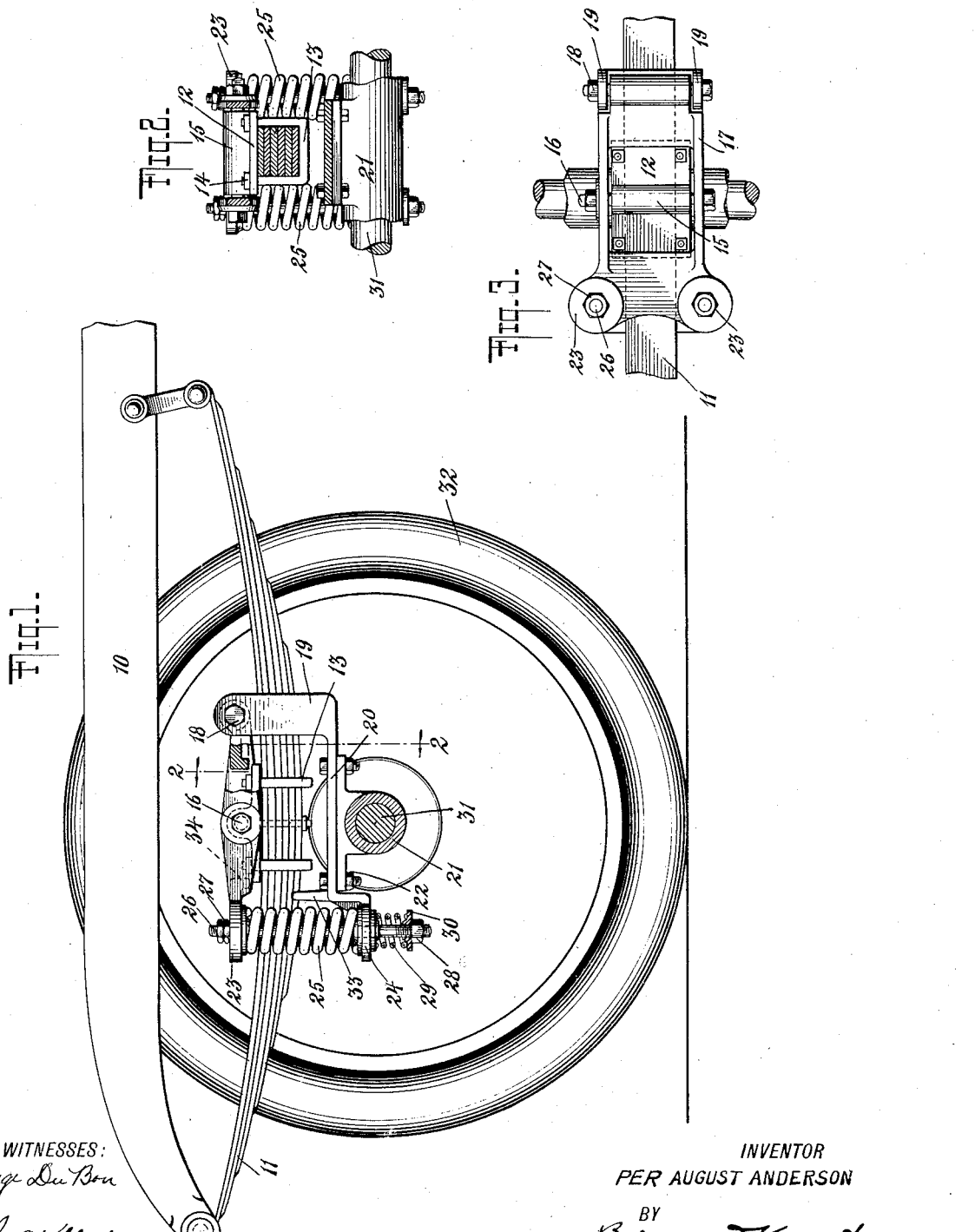
WITNESSES:
INVENTOR
PER AUGUST ANDERSON
BY
Briesen & Knauth
ATTORNEYS

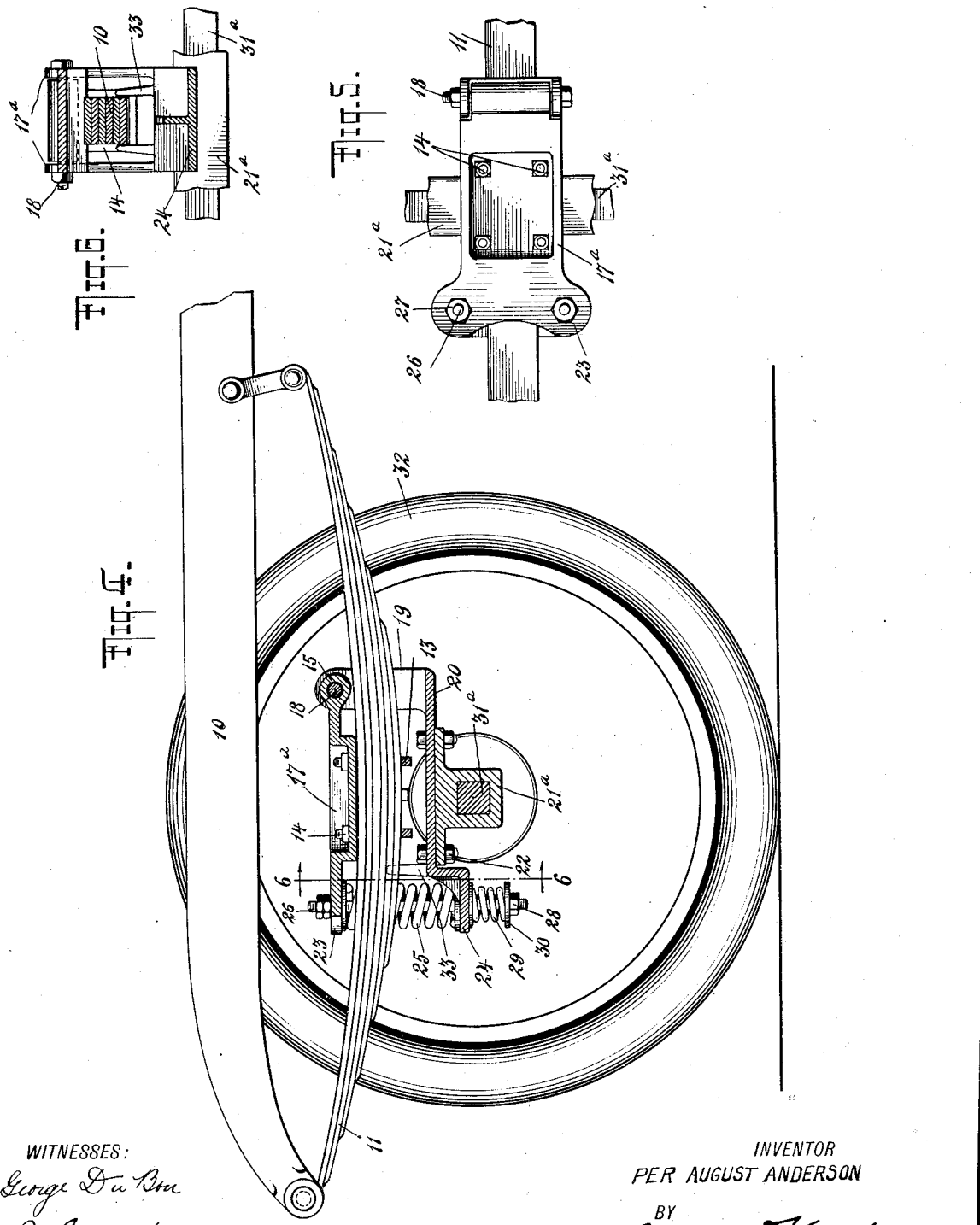

UNITED STATES PATENT OFFICE.

PER AUGUST ANDERSON, OF NEW YORK, N. Y.

SHOCK-ABSORBER.

1,213,139. Specification of Letters Patent. Patented Jan. 23, 1917.

Application filed October 1, 1913. Serial No. 792,743.

*To all whom it may concern:*

Be it known that I, PER AUGUST ANDERSON, a citizen of the United States, and resident of the borough of Manhattan, city, county, and State of New York, have invented certain new and useful Improvements in Shock-Absorbers, of which the following is a specification.

My invention relates to shock absorbers intended primarily for use in connection with motor driven and other vehicles and has for its object to provide an absorber of this character which may be readily combined with a vehicle and which will serve to effectively neutralize or take up the effects of any shocks, jolts or jars to which the vehicle may be subjected.

My improvement will be fully described hereinafter and the features of novelty will be pointed out in the appended claims.

Reference is to be had to the accompanying drawings which by way of example show my improvement applied to an automobile and in which—

Figure 1 is a sectional elevation of a portion of a vehicle with my invention in position thereon; Fig. 2 is a detail sectional view on the line 2—2 of Fig. 1; Fig. 3 is a detail plan view; Fig. 4 is a view similar to Fig. 1 of another form of my device; Fig. 5 is a detail plan view thereof similar to Fig. 3, and Fig. 6 is a sectional view on the line 6—6 of Fig. 4.

Referring more particularly to Figs. 1, 2 and 3 of the drawings, 10 represents a portion of the usual chassis or body of a motor vehicle to which the usual leaf spring 11 is attached in any customary or convenient manner. A saddle 12 rests upon the upper surface of said spring 11 and may be rigidly clamped in position in any suitable way as by means of yokes 13 which extend about said spring and through the saddle 12 and have their free ends preferably screw-threaded to receive nuts 14. The said saddle 12 is provided with a transverse bearing 15 for the accommodation of a bolt 16 which latter serves to pivotally connect the said saddle 12 with a lever frame 17. The one end of said lever frame 17 is pivotally connected at 18 with lugs 19 projecting upwardly from and preferably forming integral parts of a plate 20 rigidly secured to a sleeve 21 in any suitable manner as by means of bolts and nuts 22, it being understood that the said sleeve 21 may be constructed as an integral part of said plate 20 if this should be desired. At its opposite end the lever frame 17 is provided with spaced bearing members 23 which, when the parts are assembled, are located on opposite sides of the spring 11 and in vertical alinement with bearing members 24 forming part of the plate 20, the bearing members 24 being preferably located in a lower plane than the said plate 20. Coil springs 25 are located between said members 23 and 24 and have their opposite ends in engagement therewith and preferably positioned in recesses or the like formed on said members as clearly shown in Fig. 1. Bolts 26 extend lengthwise through said springs 25 and loosely through the members 23 and 24 and have their opposite ends screw-threaded to receive nuts 27 and 28. The said bolts project somewhat below the members 24 and lengthwise through auxiliary coil springs 29 which bear with one end against the lower surfaces of the bearing members 24 and with their other ends against washers 30 carried by said bolts 26 and held in position thereon by the nuts 28. These auxiliary springs 29 are much lighter than the springs 25 and act as recoil absorbing springs in the manner to be more fully described hereinafter.

The sleeve 21 is located upon the axle 31 and serves to connect the said axle with the spring 11 and the vehicle body through the medium of the shock absorbing device hereinbefore described. The axle 31 in the form being described is circular in cross-section as in the case of a driving axle and passes loosely through the sleeve 21, the wheels 32 being mounted on said axle in the usual manner. In order that transverse movement of the shock absorber relatively to the spring 11 may be prevented, I prefer to provide lugs 33 which project upwardly from the plate 20 at opposite sides of the spring 11 and in coöperation therewith maintain the parts against relative transverse movement, it being understood that said lugs 33 are of sufficient length to always extend somewhat above the lower surface of the spring 11 as shown best in Fig. 6. The springs 25 by being arranged in close proximity to opposite sides of said spring 11 as shown in Fig. 2 also assist in preventing such transverse movement and in some cases may be utilized alone as resilient means for neutralizing such transverse movement. In such case the lugs 33 might be omitted, if desired.

In the preferred form of my improvement the lever frame 17 is provided with projections 34 which extend over the saddle 12 and serve to coöperate therewith to limit the relative movements between said saddle and said lever frame. With this form of my invention, when an obstruction or other irregularity in the road is encountered, the wheel 32 in passing over same will be moved upwardly carrying the axle 31 with it. Through the medium of the plate 20 and lugs 19 this will cause the lever frame 17 to be rocked on the pivot 16 and the coil springs 25 in consequence compressed between the members 23 and 24. If the shock produced is a slight one the effects thereof will be entirely neutralized or absorbed by said springs 25 without having any appreciable effect on the springs 11. If, however, the force of said shock is severe enough it will first affect the springs 25 and be partly absorbed thereby and will then affect the spring 11 and be completely neutralized. In either case as the springs 25 alone or said springs together with the spring 11 return to their normal condition or rebound, the auxiliary springs 29 will be compressed and will prevent excess recoil or rebound of the parts or in other words will absorb the effects of such rebound. The springs 11 and 25 and coöperating elements are thus protected against severe strains due to excessive rebounding and at the same time the body of the vehicle travels very smoothly and without serious vibration, even over rough and uneven roads. The rocking movement of the lever frame 17 is limited as one or the other of the projections 34 comes into engagement with the saddle 12 so that excessive vibration of these parts is obviated. During the operations above described the plate 20 and its connected parts is free to oscillate upon the axle 31 within certain limits, the pivotal connection 16 between the saddle 12 and lever frame 17 automatically adjusting the remaining parts of the device accordingly.

In the form of my device illustrated in Figs. 4 and 5 the lever frame 17ª is connected directly and rigidly to the main spring 11 instead of to a saddle as in the first form described. In this case the axle 31ª is of angular cross-section instead of circular and the sleeve 21ª is provided with an axial opening of a corresponding shape, so that the plate 20 in this arrangement is incapable of a rocking movement on the axle 31ª. Otherwise the construction and operation of this form of my improvement may be the same as the form shown in Figs. 1, 2 and 3.

In both forms of my shock absorber shown and described the pivot 16 or the approximate center of the lever frames 17 and 17ª is directly above the axle, which in consequence is located beneath the approximate center of the spring 11, instead of to the front or rear thereof as is the case with many existing types of shock absorbers. The strains or stresses produced by shocks are thus evenly distributed along said springs 11 and in consequence the maximum resiliency and absorbing action of said spring is always obtained with a minimum of strain therein when the force exerted by said shocks is sufficient to effect said springs 11. In the same way by having the pivotal connection 18 and the axial median line of the springs 25 located substantially equidistant from the axle 31 or 31ª, a maximum neutralizing action is assured in the springs 25 and the entire device is evenly balanced. In addition to this by connecting the axle with the upper surface of the spring 11 through the medium of the lever frames 17 and 17ª the distance between said axle and the body of the vehicle is not materially increased and remains substantially the same as when the springs 11 are directly connected with said axle and the shock absorber is omitted. In other words the body is not raised as is the case in many existing constructions and the center of gravity is maintained at a desirable low point, thus making it possible to introduce my improvement into constructions of known reliability without interfering with the stability thereof.

With my improvement the effects of the destructive, continually recurring small shocks insufficient to affect the main springs 11 are completely neutralized and absorbed so that the sensitive parts of the vehicle are protected against excessive and injurious vibration.

Various changes in the forms shown and described may be made within the scope of the claims without departing from the spirit of my invention.

I claim:

1. The combination of a vehicle leaf spring, an axle, and resilient shock absorbing means connecting said axle with the upper surface of said leaf spring extending across the opposite edges of said leaf spring whereby transverse rocking of the latter is arrested.

2. The combination of a vehicle leaf spring, an axle located approximately centrally beneath said leaf spring, a member connected with said leaf spring and having its ends located in planes at opposite sides of said axle, means for pivotally connecting one end of said member with said axle and resilient shock absorbing means for connecting the opposite end of said member with said axle, said resilient means extending across the opposite edges of said leaf spring whereby transverse rocking of the latter is arrested.

3. The combination of a vehicle leaf spring, an axle located approximately centrally beneath said leaf spring, a member connected with the upper surface of said leaf spring and located approximately midway between the ends thereof, a member carried by said axle and having its one end portion pivotally connected with one end of said first named member at a point above said leaf spring and shock absorbing springs located on opposite sides of said leaf spring and between the opposite ends of said two members.

4. The combination of a vehicle leaf spring, an axle, a device rigidly connected with the upper surface of said leaf spring, a member carried by said axle and having its one end portion pivotally connected with one end of said device and shock absorbing springs located between the opposite ends of said device and said member and extending across the opposite edges of said leaf spring whereby transverse rocking of the latter is arrested.

5. The combination of a vehicle leaf spring, an axle, resilient shock absorbing means connecting said axle with the upper surface of said leaf spring and extending across an edge of said leaf spring whereby a transverse rocking of the latter is arrested, and recoil absorbing means connected with said shock absorbing means whereby the rebound thereof is neutralized.

6. The combination of a vehicle leaf spring, an axle, a device carried by said leaf spring, a member carried by said axle and having its one end portion pivotally connected with one end of said device, shock absorbing springs located between the opposite ends of said device and said member and extending across the opposite edges of said leaf spring whereby transverse rocking of the latter is arrested, and recoil absorbing springs located below said member whereby the rebound of said shock absorbing springs is neutralized.

7. The combination of a vehicle leaf spring, an axle below the same, resilient shock absorbing means extending from a point below said leaf spring to a point above the same and connecting said axle with the upper surface of said leaf spring and means carried by said shock absorbing means in slidable engagement with said leaf spring for preventing lateral displacement of said shock absorbing means in opposite directions relatively to said leaf spring.

8. The combination of a vehicle leaf spring, an axle, a device carried by said leaf spring, a member carried by said axle and having its one end portion pivotally connected with one end of said device, shock absorbing springs located between the opposite end of said device and said member, and lugs projecting upwardly from said member on opposite sides of said leaf spring whereby lateral displacement thereof in opposite directions is prevented.

In testimony whereof, I have hereunto set my hand in the presence of two subscribing witnesses.

PER AUGUST ANDERSON.

Witnesses:
    JOHN A. KEHLENBECK,
    HENRY RUHL.